May 1, 1956   C. F. WHITE   2,743,667
COMPRESSES
Filed March 20, 1953   2 Sheets-Sheet 1

CECIL F. WHITE
INVENTOR
HUEBNER, BEEHLER,
WORREL & HERZIG
ATTORNEYS
BY

May 1, 1956 C. F. WHITE 2,743,667
COMPRESSES
Filed March 20, 1953 2 Sheets-Sheet 2
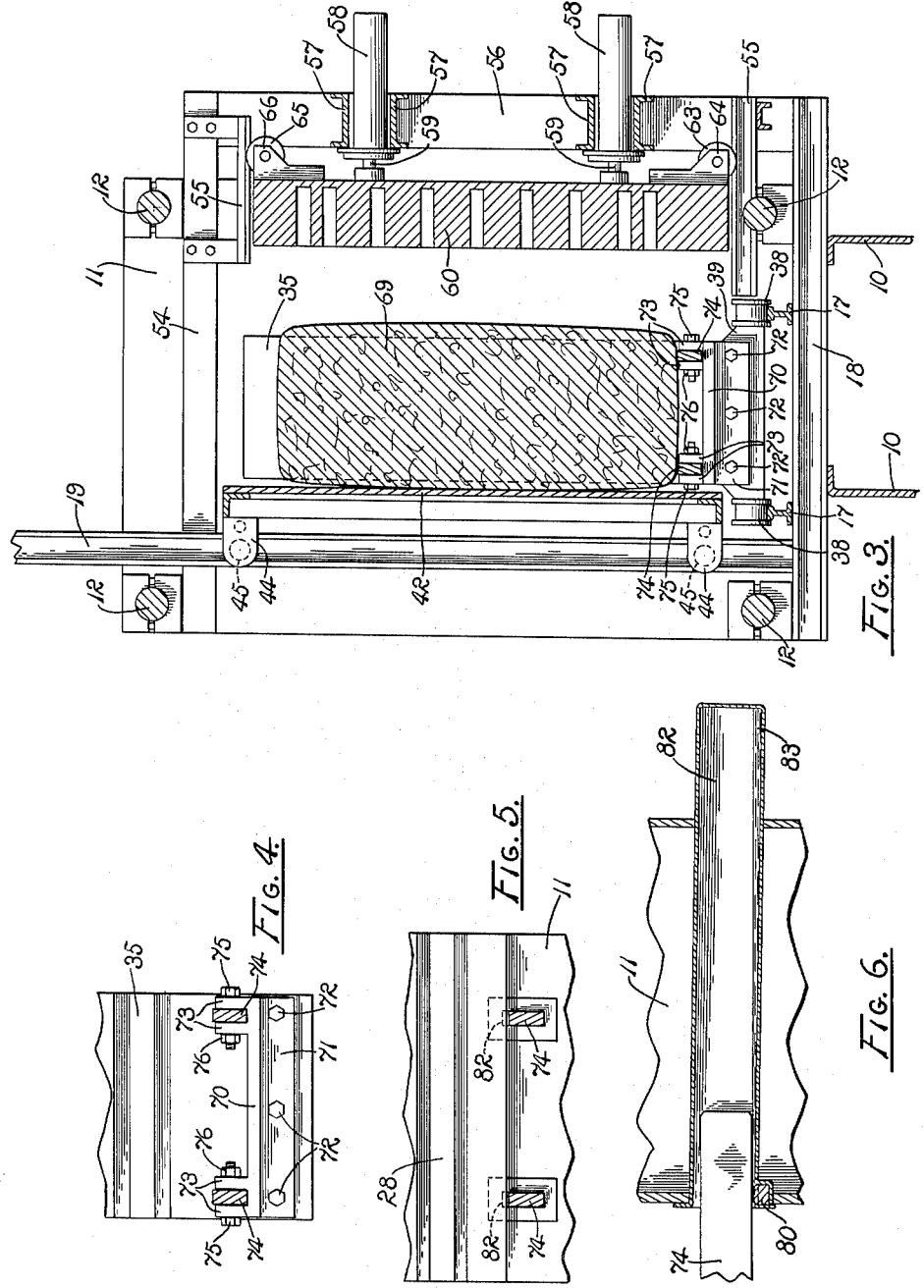
CECIL F. WHITE
INVENTOR
HUEBNER, BEEHLER,
WORREL & HERZIG
ATTORNEYS
BY Richard M. Worrel United States Patent Office 2,743,667
Patented May 1, 1956

2,743,667
COMPRESSES
Cecil F. White, Fresno, Calif.
Application March 20, 1953, Serial No. 343,677
7 Claims. (Cl. 100—232)

The present invention relates to compresses for compacting bales of cotton and the like and more particularly to improved bale support means therein.

Although the instant invention is not limited to use in a compress of the character described in my copending United States patent application Serial No. 305,106, filed August 19, 1952, entitled "Compresses," it is conveniently illustrated in connection with such a compress and this application should be regarded as a continuation-in-part of that to which reference has been made. Further, although the present invention has particularly valuable application to portable compresses because of reduction in power requirements and improved bale form made possible thereby, it is advantageously employed in immobile compresses as well.

The mobile compress described in the patent application referred to employs a plurality of movable platens reciprocally positionable to and from a bale chamber defining relation and powered means for urging the platens into said relation to compress bulk material, gin bales or standard density bales into bales of increased density. Such materials, or bales, are rested on a horizontal platen or platform preliminary to increased compression, which is vertically movable by means of a hydraulic ram properly to position the material or bale for further compression. It has been discovered that the compressing of bales of cotton and the like while rested on platforms of the character referred to results in "end-pressed" bales which are generally undesirable in the trade. Further, the resistance offered by such platforms to the downward endward expansion of bales while being horizontally compressed requires vastly increased compressive forces than are otherwise required.

While it is possible in the mobile compress of my earlier application to retract the platform downwardly once horizontal compression of a bale was initiated so that bales under compression could expand endwardly downwardly as well as endwardly upwardly, the additional manipulation required is undesirable and the timeliness of the retraction subject to human error and variable results.

The board essence of the present invention resides in the discovery of an improved structure for automatically supporting bales and the like in compresses which avoids the described difficulties incident to platform support.

An object of the present invention is to provide an improved compress having means for supporting cotton bales and the like therein during compression which accommodates appreciable upward and downward expansion of the bales.

Another object is to provide a compress adapted to receive bales in endwardly erect position and to compress the bales while the ends thereof are substantially free of confinement.

Another object is to provide a compress having a ramming platen and means mounted on said platen movable integrally therewith to support bales during compression.

Another object is to avoid end compression in the formation of gin, standard, and high density bales and the like.

Another object is to reduce the power requirements of compresses to compact bales to given density.

Another object is to provide a device of the character described having improved automatic lubricating means for the movable bale support.

Further objects and advantages are to provide improved elements and arrangements thereof in a device of the character and for the purposes set forth.

Additional objects and advantages will become apparent in the subsequent description in the specification.

In the drawings:

Fig. 3 is a vertical section taken on line 3—3 of Fig. 1.

Fig. 4 is a somewhat enlarged fragmentary section taken on line 4—4 of Fig. 2.

Fig. 5 is a somewhat enlarged fragmentary view taken on line 5—5 of Fig. 2.

Fig. 6 is a somewhat enlarged fragmentary section taken on line 6—6 of Fig. 1.

Figures 1, 2:
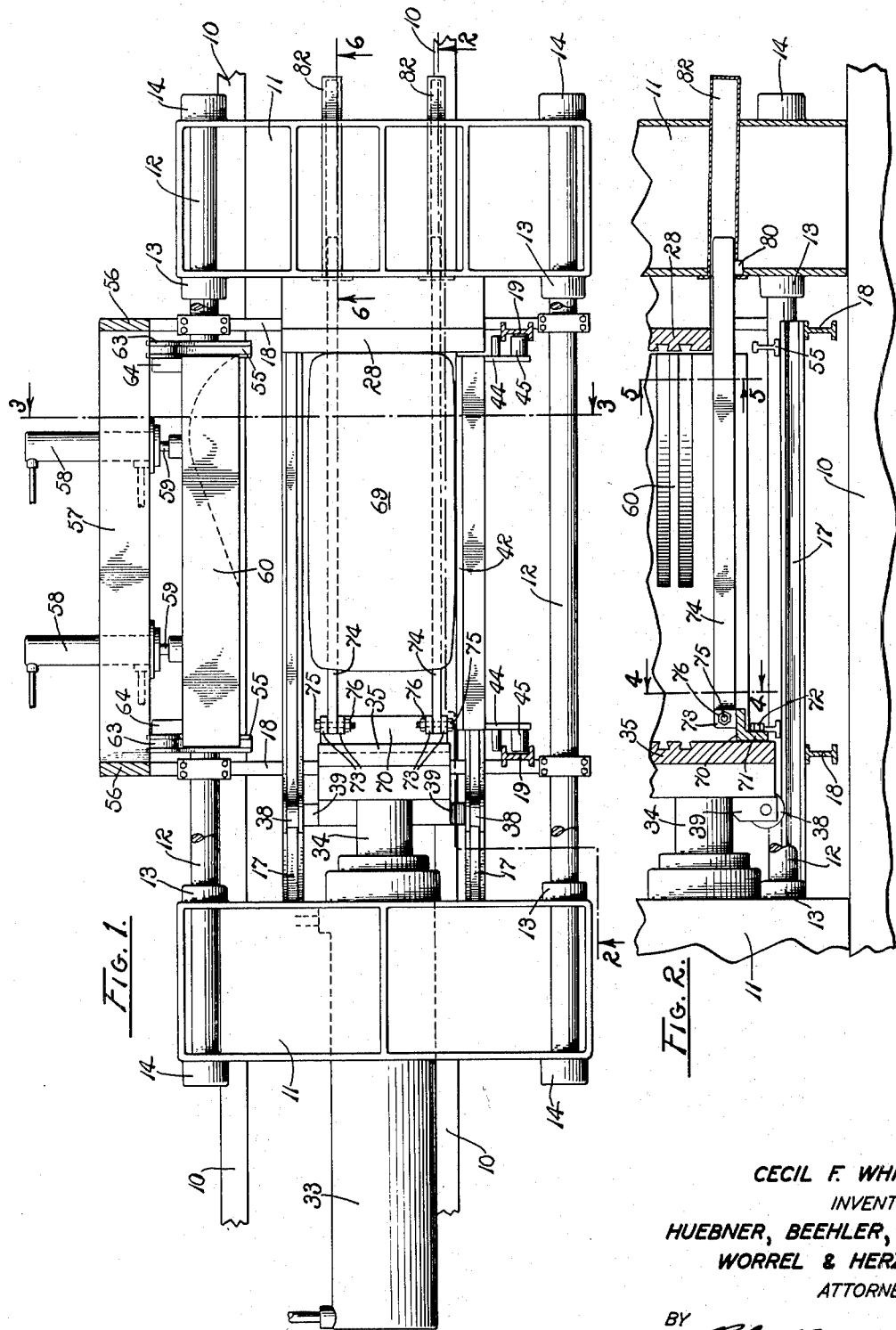
Fig. 1 is a fragmentary plan view of a compress embodying the principles of the present invention, having portions thereof broken away for illustrative convenience.
Fig. 2 is a fragmentary vertical section taken on line 2—2 of Fig. 1.

Referring in greater detail to the drawings:

For descriptive convenience, the subject invention is shown in a compress of the character described in the patent application referred to and attention first directed to the structure thereof. A supporting frame is indicated generally at 10 and serves to support the compress and, if portability is desired, may conveniently take the form of the bed frame of an automotive truck, railway car, or the like. Substantially rectangular heads 11 of any suitable form are rigidly mounted on the frame 10 and upwardly extended therefrom in substantially parallel relation. Two pairs of substantially parallel tie rods 12 interconnect the heads 11 and have inner nuts 13 and outer nuts 14 screw threadedly mounted thereon tightly against their respective heads to reinforce the same in their upwardly extended parallel relation.

The heads 11 are conveniently mounted transversely of the frame 10 preferably so that, if mounted on a mobile vehicle, the heads are spaced longitudinally of the normal direction of movement thereof. For descriptive convenience, the head viewed at the left in Figs. 2 and 3 is referred to as the forward frame head and the one at the right, as the rearward frame head. A pair of substantially parallel rails 17 are mounted in substantially horizontal position between the heads 11, as on substantially parallel cross ties or rails 18. A pair of substantially vertical rails 19 are upwardly extended from the transverse rails 18 in substantially parallel relation.

A substantially rectangular holding platen 28 is rigidly mounted on the rearward frame head 11 in a substantially erect position, as best shown in Figs. 1 and 2. Any desired number of two-way hydraulic rams 33 are mounted in a substantially horizontal position in the forward frame head 11. The rams may be of any suitable type capable of powered extension and contraction and provide piston rods 34 extended therefrom toward the holding platen 28. A substantially rectangular principal ramming platen 35 is mounted on the piston rods in a substantially erect position. To support the principal ramming platen 35 and to avoid the imposition of the weight thereof on the piston rods 34, a pair of flanged wheels 38 are rotatably mounted on the platen in rolling engagement with the rails 17, as by legs 39.

A substantially rectangular vertically reciprocal platen 42 is mounted in the vertical rails 19 by means of two pairs of horizontally extended arms 44 mounting pairs of rollers 45 thereon in rolling engagement with the rails 19. The rollers of each pair engage their respective rails on opposite sides of a flange portion thereof so that as the platen is moved elevationally, it is constrained to substantially continuous vertical attitude. Powered means, not shown, are connected to the vertically reciprocal platen for elevationally positioning the same during operation of the compress.

As shown in Figs. 1 and 3, a pair of transverse members 54 are rigidly mounted on the upper pair of tie rods 12 in vertical alignment with the rails 18. Auxiliary transverse rails 55 are mounted on, and below, the transverse members 54 and, on and above, the rails 18 in parallel spaced relation thereto. As shown in Fig. 3, a pair of posts 56 vertically interconnect the transverse members 54 and the rails 18. Rigid struts 57 interconnect the posts. A plurality of rams 58 are mounted on the struts in substantially horizontal position and provide piston rods 59 horizontally extended substantially transversely of the frame 10. A substantially rectangular side compression platen 60 is mounted in a substantially erect position on the piston rods. A pair of lower flanged wheels 63 are mounted in supporting relation to the side compression platen 60 by legs 64 in rolling engagement on the auxiliary rails 55 mounted on the transverse rails 18 and an upper pair of flanged wheels 65 are mounted on the platen 60, by arms 66, in rolling engagement with the auxiliary rails 55 mounted on the transverse members 55.

The foregoing elements are shown and described in my copending patent application referred to and have been given the same designating numerals in the drawings. It will be obvious that the platens 28, 35, 42, and 60 define a bale chamber adapted to receive material to be compressed. Elevational movement of the vertically reciprocal platen 42 permits convenient access to the bale chamber to position bulk material or bales, represented at 69, to be compacted and to remove bales subsequent to compacting. When the platen 42 is in lowered position, as shown in Fig. 3, it provides resistance to compression exerted by the side compression platen 60 incident to expansion of the rams 58. The holding platen 28 provides resistance to compression exerted by the principal ramming platen 35. The hydraulic system for actuating the rams is not described in detail herein. Attention is now directed to the improvements of the present invention which provide support for bales in the bale chamber in a manner successfully accomplishing the objects set forth.

Any desired number of brackets 70 are mounted on the principal ramming platen 35 adjacent to the lower edges thereof. For conventional cotton bales, the applicant prefers to utilize a pair of brackets 70 rigidly interconnected by a mounting plate 71 bolted or otherwise rigidly secured to the platen, as at 72. The brackets each provide a pair of upwardly extended ears 73. An elongated bale support bar 74 is fitted between the ears 73 of each bracket 70 and pivotally mounted on the bracket by pintles 75 extended through the ears and the end of the bars received therebetween. The pintles conveniently take the form of bolts which are retained in place by nuts 76 screw-threadably mounted thereon. The pintles are horizontally aligned and disposed in substantially parallel relation to the face of the ramming platen 35.

The bars 74 are preferably rectangular in cross section, as shown in Figs. 4 and 5, and disposed on edge. As best shown in Fig. 2, the bars 74 are extended substantially horizontally beneath the bale chamber in parallel spaced relation, as shown in Fig. 1.

A support bearing 80 is mounted in the rearward head 11, or in any other suitable portion of the apparatus in supporting relation to the extended end of each bar 74. The brackets 70 and the bearings 80 are so positioned that the bars have upper edges and lower edges disposed in respective, common, upper and lower planes. The bearings are preferably slightly, almost imperceptibly, lower than the lower edges of the end portions of the bars mounted in the brackets, for reasons soon to become apparent.

When bales 69 are rested on the upper edges of the bars 74, considerable weight is imposed on the bearings 80. In order to provide effective lubrication, a lubricant container 82 is mounted adjacent to each bearing 80 and extended therefrom away from the bale chamber. The containers slidably receive the extended ends of the bars rested on their bearings and are adapted to contain a pool of lubricant 83 having a surface substantially flush with its adjacent bearing 80. The containers 82 are of a length in excess of the maximum travel of the principal ramming platen 35 so as to accommodate the extension of the bars into the containers during movement of the ramming platen 35 to bale compressing position. Inasmuch as the ends of the bars pivotally mounted in the brackets 70 are slightly higher than the ends of the bars rested on the bearings 80, horizontal movement of the principal ramming platen 35 toward the bearings 80 causes the bars to tilt downwardly very slightly, as the principal ramming platen moves to compressing position, but sufficient to bring the lower edges of the bars in their respective containers into the lubricant 83, thus applying the same to the lower edges of the bars.

*Operation*

The operation and utility of the subject invention are believed to be clearly apparent and are briefly summarized at this point. With the vertically reciprocal platen 42 upwardly retracted and the platens 35 and 60 retracted, as shown in Fig. 1, a bale of cotton 69, or other object or mass to be compressed, is disposed on the upper edges of the bars 74. The vertically reciprocal platen 42 is lowered into the position shown in Fig. 3. Initial compression is exerted on the bale by expanding the rams 58 and forcing the side compression platen 60 inwardly of the bale chamber until it is moved inwardly of the adjacent lateral edge of the holding platen 28.

The principal ramming platen 35 is then forced toward the holding platen 28 by controlled expansion of the rams 33. The bars 74 supporting the bale move unitarily with the ramming platen 35 and carry the bale into engagement with the holding platen 28. Continued movement of the ramming platen toward the holding platen causes the bars slidably to pass under the bale and by frictional engagement with the bale serve initially to seat the bale against the holding platen. When the ramming platen 35 engages the bale it compacts the bale against the holding platen between the side platens 42 and 60. The movement of the bars 74 unitarily with the ramming platen 35 in friction engagement with the bales 69 aids in the compression, rather than resisting such compression as when the bales are supported on a stationary platform.

As the bales are compacted, they are free to expand endwardly upwardly between the platens and endwardly downwardly between the bars 74 thus avoiding the objectionable end compressed bales. When the bales are rested on a platform during compression, considerably more force is required to compress the bales to a desired density because of the excessive compression incurred adjacent to the platform. The utilization of the described bale support, obviates this excessive localized compression and substantially reduces the total power which must be exerted on the principal ramming platen to achieve a bale of desired density.

Subsequent to bale compression and banding, the platens 35 and 60 are retracted and the platen 42 elevated. As the platen 35 retracts, the bars 74 carry the compacted bale away from the holding platen against which it has been compressed for greater convenience of removal. Access is then conveniently had to the bale chamber for purposes of removing the compacted bale.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. In a compress for cotton and the like having a frame providing a bale compressing station therein, and means defining a bale chamber at the compressing station, said means including a compression platen having a compression face mounted for horizontal reciprocal movement toward and from the bale chamber whereby bales are compressed in the chamber, the improvement which comprises bale supporting bar means pivotally mounted for swinging in a vertical direction on the compression face of the compression platen for unitary reciprocal movement with the compression platen and substantially horizontally extended therefrom beneath the bale chamber, and support means mounted in the frame in spaced relation to the compression platen and in continuous supporting relation to the bar means precluding downward pivotal movement of the bar means from the bale chamber.

2. A compress comprising a plurality of movable platens reciprocally positionable to and from a bale chamber defining relation, at least one thereof being horizontally reciprocable, powered means for urging the platens into said bale chamber defining relation to compress bales therebetween, a plurality of bale supporting bars pivotally mounted on substantially aligned horizontal axes on the horizontally reciprocal platen and substantially horizontally extended therefrom in substantially parallel spaced relation aligned with the directions of reciprocation of their respective platen and beneath the bale chamber, and bearings continuously slidably supporting the bars in spaced relation to the platen on which they are mounted and precluding downward pivotal movement of the bars from the bale chamber.

3. A compress comprising a frame, a plurality of substantially erect platens mounted in the frame and defining a bale chamber therebetween, means mounting one of the platens for reciprocal horizontal movement to and from the bale chamber, powered means connected to the movable platen adapted to force said platen to and from the bale chamber against bales compressed therein, a plurality of brackets mounted on the movable platen, an elongated bar pivotally connected to each bracket and substantially horizontally extended therefrom beneath the bale chamber, the bars being substantially parallel and having upper edges disposed in a common plane, and support bearings mounted in the frame opposite to the bale chamber from said movable platen individually supporting the extended ends of the bars for reciprocal endward movement thereacross incident to reciprocal movement of said movable platen, the bars being of a length greater than the maximum spacing of the platen mounting the bars and the support bearings during reciprocation of said platen whereby the bars are continuously rested on the support bearings.

4. In a compress for compressing previously formed bales into bales of higher density having a plurality of substantially erect platens reciprocally positionable to and from a bale chamber defining relation, and powered means connected to the platens adapted to urge the platens into bale defining relation to compress bales therebetween; the combination of bracket means mounted on one of the platens adjacent to a lower edge thereof, a plurality of elongated bars having opposite end portions, axially aligned substantially horizontal pintles mounted on the bracket means and pivotally mounting corresponding ends of the bars on the bracket means with opposite ends thereof extended substantially horizontally therefrom beneath the bale chamber in substantially parallel relation, said bars having upper and lower edges at substantially the same respective elevations, slide bearings mounted at the opposite side of the bale chamber from the bracket means and slidably supporting the lower edges of the bars at a common elevation slightly below the elevation of the lower edges of the ends of the bars mounted in the bracket, and a lubricant container mounted adjacent to each slide bearing and extended therefrom away from the bale chamber, each container receiving the extended end of the bar rested on its respective slide bearing and being adapted to contain a pool of lubricant having a surface substantially flush with its slide bearing into which the lower edge of its respective bar dips as the platen mounting the bars is urged into the bale chamber.

5. In a compress having a support frame, a substantially erect holding platen mounted in the frame, a substantially erect principal ramming platen, means mounting the principal ramming platen in the frame in substantially parallel relation to the holding platen and for substantially horizontal reciprocal movement toward and from the holding platen, powered means connected to the principal ramming platen adapted to actuate said platen in its reciprocal movement, a pluarlity of elongated bale support bars, means pivotally mounting the bars in horizontal spaced relation at substantially the same elevation on the principal ramming platen, said bars being substantially horizontally extended in substantially parallel relation from the principal ramming platen in substantial alignment with the reciprocal movement of the ramming platen and beneath the holding platen, bearings mounted in the frame in supporting relation to the extended ends of the bars and supporting said ends of the bars at approximately the same elevation but slightly lower than the ends thereof pivotally connected to the principal ramming platen, and a lubricant container mounted adjacent to each bearing and extended therefrom away from the principal ramming platen, each container receiving the extended end of the bar rested on its respective bearing and being adapted to contain a pool of lubricant having a surface substantially flush with its bearing into which the lower edge of its respective bar dips as the principal ramming platen is moved toward the holding platen.

6. In a compress having a bale chamber adapted to have bales compressed therein, means mounted for reciprocal horizontal rectilinear movement to and from the bale chamber, powered means for selectively moving the reciprocal means to and from the bale chamber, a plurality of bale supporting bars pivotally mounted on substantially alinged horizontal axes on the reciprocal means and extended therefrom in substantially parallel spaced horizontal relation aligned with the direction of movement of the reciprocal means beneath the bale chamber, and bearing means supporting the bars in spaced relation to the reciprocal means in substantially horizontal position.

7. A compress comprising means defining a bale chamber, said means including a ramming platen having a compression face mounted for substantially horizontal movement toward and from the bale chamber, a plurality of elongated bars, means pivotally mounting the bars on the ramming platen for elevational pivotal movement with the bars extended from the ramming platen in substantially parallel laterally spaced relation beneath the bale chamber and longitudinally in the direction of movement of the ramming platen toward and from the chamber, and means engaging the bars in spaced relation to the platen with the bars continuously gravitationally rested downwardly thereon, said last named means precluding downward pivotal movement of the bars from the bale chamber.

References Cited in the file of this patent
UNITED STATES PATENTS

| 430,986 | Blackman | June 24, 1890 |
| 1,096,398 | Sheppard | May 12, 1914 |
| 1,666,020 | Menne | Apr. 10, 1928 |